United States Patent [19]

Farrell

[11] Patent Number: 5,383,129

[45] Date of Patent: Jan. 17, 1995

[54] METHOD OF ESTIMATING COST OF PRINTING MATERIALS USED TO PRINT A JOB ON A PRINTING APPARATUS

[75] Inventor: Michael E. Farrell, Fairport, N.Y.

[73] Assignee: Xerox Corporation, Stamford, Conn.

[21] Appl. No.: 113,625

[22] Filed: Aug. 31, 1993

[51] Int. Cl.6 .............................................. G06F 15/20
[52] U.S. Cl. ................................ 364/464.01; 355/308; 377/13; 377/15
[58] Field of Search .................. 364/461.01; 355/308; 377/8, 13, 15

[56] References Cited

U.S. PATENT DOCUMENTS

| | | | |
|---|---|---|---|
| 3,378,831 | 4/1968 | Metcalf | 377/13 X |
| 3,427,441 | 2/1969 | Swords | 377/13 |
| 3,576,431 | 4/1971 | Zaccard et al. | 235/92 |
| 3,660,649 | 5/1972 | Gilchrist et al. | 364/464.01 |
| 3,872,282 | 3/1975 | Long | 235/925 |
| 3,893,175 | 7/1975 | Solomon | 364/464.01 X |
| 3,911,254 | 10/1975 | Leibrecht et al. | 235/92 |
| 3,971,919 | 7/1976 | Fantozzi | 235/92 |
| 4,019,028 | 4/1977 | Polyzoes | 235/92 |
| 4,058,815 | 11/1977 | Warner et al. | 355/14 |
| 4,516,213 | 5/1985 | Gidden | 364/464.04 X |
| 4,531,826 | 7/1985 | Stoughton et al. | 355/14 |
| 5,095,369 | 3/1992 | Ortiz et al. | 358/296 |
| 5,117,258 | 5/1992 | Iwata | 355/201 |
| 5,124,731 | 6/1992 | Knodt et al. | 346/157 |
| 5,133,048 | 7/1992 | Parsons et al. | 395/111 |
| 5,146,344 | 9/1992 | Bennett et al. | 358/296 |
| 5,204,699 | 4/1993 | Birnbaum et al. | 346/160 |

*Primary Examiner*—Edward R. Cosimano
*Attorney, Agent, or Firm*—Gary B. Cohen

[57] ABSTRACT

There is provided a method of estimating cost of printing materials used to print a job on a printing apparatus. The method includes the steps of: storing billing rates reflecting the cost of printing materials to be used in printing the job, selecting a first quantity of printing materials to be used in printing the job, and, prior to printing the job, calculating, as a function of the first selected quantity of printing materials and one of the stored billing rates, a first printing materials cost of the job.

13 Claims, 12 Drawing Sheets

FIG. 9

Printing Material Cost Estimate

| Printing Material List | Unit Cost | Quantity per Set | Extended Cost per Set |
|---|---|---|---|
| Media Material Items<br>- Body Stock Description<br>- Cover Stock Description<br>- Tab Stock Description<br>•<br>•<br>• | Cost1<br>Cost2 | Q1<br>Q2 | Cost1 × Q1<br>Cost2 × Q2 |
| Marking Material Items<br>- Ink or Dry Ink (Toner)<br>- Fusing Agent<br>- Drying Powder<br>•<br>•<br>• | Cost3 | Q3 | Cost3 × Q3 |
| Finishing Material Items<br>- Stitch Wire/Staples<br>- Binding Tape<br>- Shrink Wrap Film<br>•<br>•<br>• | Cost4 | Q4 | Cost4 × Q4 |
| Estimated Cost per Copy Set ||| Sum Extended Cost Items Above |
| Number of Copy Sets ||| N |
| Estimated Printing Material Cost for Job ||| Set Cost × N |

*FIG. 12*

METHOD OF ESTIMATING COST OF PRINTING MATERIALS USED TO PRINT A JOB ON A PRINTING APPARATUS

BACKGROUND OF THE INVENTION

The present invention relates generally to a technique for printing a print job, and more particularly to determining the cost of printing materials used in printing the print job.

Current electronic reprographic systems are capable of counting pages within a print job. These systems comprise accounting mechanisms for computing the number of pages that are printed for customer records or for billing purposes.

Current counting systems may operate in a number of different ways. One common method of counting is for the reprographic system to count electronic pulses during the copying process. Other systems require cards or cassettes to be inserted into the reprographic system for recording the number of copies made while the card or cassette is inserted in the machine.

The following references relate to printing systems which allow for statistical tabulation of customer print jobs:

U.S. Pat. No. 3,576,431

Patentee: Zaccard et al.

Issued: Apr. 27, 1971

U.S. Pat. No. 3,872.282

Patentee: Long

Issued: Mar. 18, 1975

U.S. Pat. No. 3,971,919

Patentee: Fantozzi

Issued: Jul. 27, 1976

U.S. Pat. No. 3,911,254

Patentee: Leibrecht et al.

Issued: Oct. 7, 1975

U.S. Pat. No. 4,019,028

Patentee: Polyzoes

Issued: Apr. 19, 1977

U.S. Pat. No. 4,058,815

Patentee: Warner et al.

Issued: Nov. 15, 1977

U.S. Pat. No. 4,531,826

Patentee: Stoughton

Issued: Jul. 30, 1985

U.S. Pat. No. 3,576,431 discloses an apparatus which can program a duplicating machine to make a preset number of copies, compute an average cost per copy based on the size of the copy order and record a numerical value. The apparatus produces a differing number of pulses per copy as copies are made and a pulse responsive counter gives a cumulative numerical indication of the number of pulses produced. Thus, the cost per job can be computed as each pulse transmitted to the counter corresponds to a fixed unit of cost.

U.S. Pat. No. 3,872,282 discloses a copying machine recording system for cost control wherein a portable cassette is used by each authorized user to monitor the cost of the print jobs.

U.S. Pat. No. 3,971,919 discloses a programmable billing system suitable for use in automatic reproduction machines. The billing system provides wide flexibility in programming billing rate break points into a billing meter system wherein a pulse train indicative of the copies produced is fed into a plurality of binary counters. The information from the counters is decoded for entering copy count data into the billing meter system.

U.S. Pat. No. 3,911,254 discloses a method and apparatus for automatically adding cycles, wherein a customer can be charged for a particular rate depending on the number of copies within a print job.

U.S. Pat. No. 4,019,028 discloses a printing machine with variable counter control, wherein billing schemes can be altered by inserting a field changeable billing code circuit board. A number of different billing schemes are provided depending upon the number of copies in the print job.

U.S. Pat. No. 4,058,815 discloses a reproduction machine which includes a metering system for counting numbers of jobs, originals and prints allowing flexibility in the way the machine user is billed for the use of the machine. The metering arrangement can be used in a variety of billing schemes without the need to re-design any of the circuitry.

U.S. Pat. No. 4,531,826 discloses an event controller and access controller wherein a number of individual user accounts are provided to store copy counts from a photocopier. During setup, these accounts can be monitored or altered if a user has access to these functions.

The following reference relates specifically to an apparatus for calculating a fee based on size and number of sheets used:

U.S. Pat. No. 5,117,258

Patentee: Iwata

Issued: May 26, 1992

U.S. Pat. No. 5,117,258 discloses an image forming apparatus which includes a plurality of cassettes for storing paper sheets of different sizes and a feeding device for feeding the paper sheets serially. The image forming apparatus forms an image on each paper sheet fed by the feeding device. A size detector detects the size of each paper sheet used and a copying fee is calculated based on the size and number of sheets used.

The following reference relates to a printing system for generating an invoice for a printed print job:

U.S. Pat. No. 5,146,344

Patentee: Bennett et al.

Issued: Sep. 8, 1992

U.S. Pat. No. 5,146,344 discloses a method in which an operator programs the printing system to perform selected system functions required for a print job and performs those selected functions. In one example, the selected functions may include scanning of documents, simplexing, duplexing, binding, stitching and printing on special stock. As a result of performing the selected functions, various system count totals are developed. The cost of the print job can be determined by multiplying these system count totals with respective, preset billing rates.

Each of the above references determine as fee on the basis of a printed print job. For small print jobs, this approach is acceptable since the amount of materials to be consumed is relatively small. For large print jobs, however, this approach may be unacceptable. In particular, with the advent of the multifunctional electronic printing machines, publishing with printers has become a reality. Publishing with a printer can result in a relatively large print job. When using a printing machine to print a relatively large print job, consumption of printing materials can be significant, and the cost of printing materials can be quite high. In view of such significant consumption and cost, a customer may want to know the cost of the printing materials to be used in developing a print job prior to having the same executed. It would be desirable to provide an approach which estimates the cost of printing materials to be used in printing a print job.

Additionally, U.S. Pat. No. 5,146,344 does not necessarily provide an accurate assessment of stock cost in determining the cost of a print job. That is, while U.S. Pat. No. 5,146,344 discloses that a billing rate can be set for printing on special stock, it does not comprehend that different billing rates should be set for all types of stock, including both ordinary and special stock. It would be desirable to provide an approach that determines the cost of printing a print job on the basis of each of the stock types employed.

BRIEF SUMMARY OF THE INVENTION

In accordance with the present invention there is provided a method of estimating cost of printing materials used to print a job or a printing apparatus. The method includes the steps of: storing billing rates reflecting the cost of printing materials to be used in printing the job; selecting a first quantity of printing materials to be used in printing the job; and prior to printing the job, calculating, as a function of the first selected quantity of printing materials and one of the stored billing rates, a first printing materials cost of the job.

These and other aspects of the invention will become apparent from the following description, the description being used to illustrate a preferred embodiment of the invention when read in conjunction with the accompanying drawings.

BRIEF DESCRIPTION OF THE DRAWINGS

FIG. 9 is a view depicting an exemplary job programming ticket and job scorecard displayed on the User Interface (UI) touchscreen of the printing system shown in FIG. 1;

FIG. 12 is an elevational view of a customer job estimate sheet as developed with the steps of FIGS. 10-11.

A DETAILED DESCRIPTION OF A PREFERRED EMBODIMENT

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
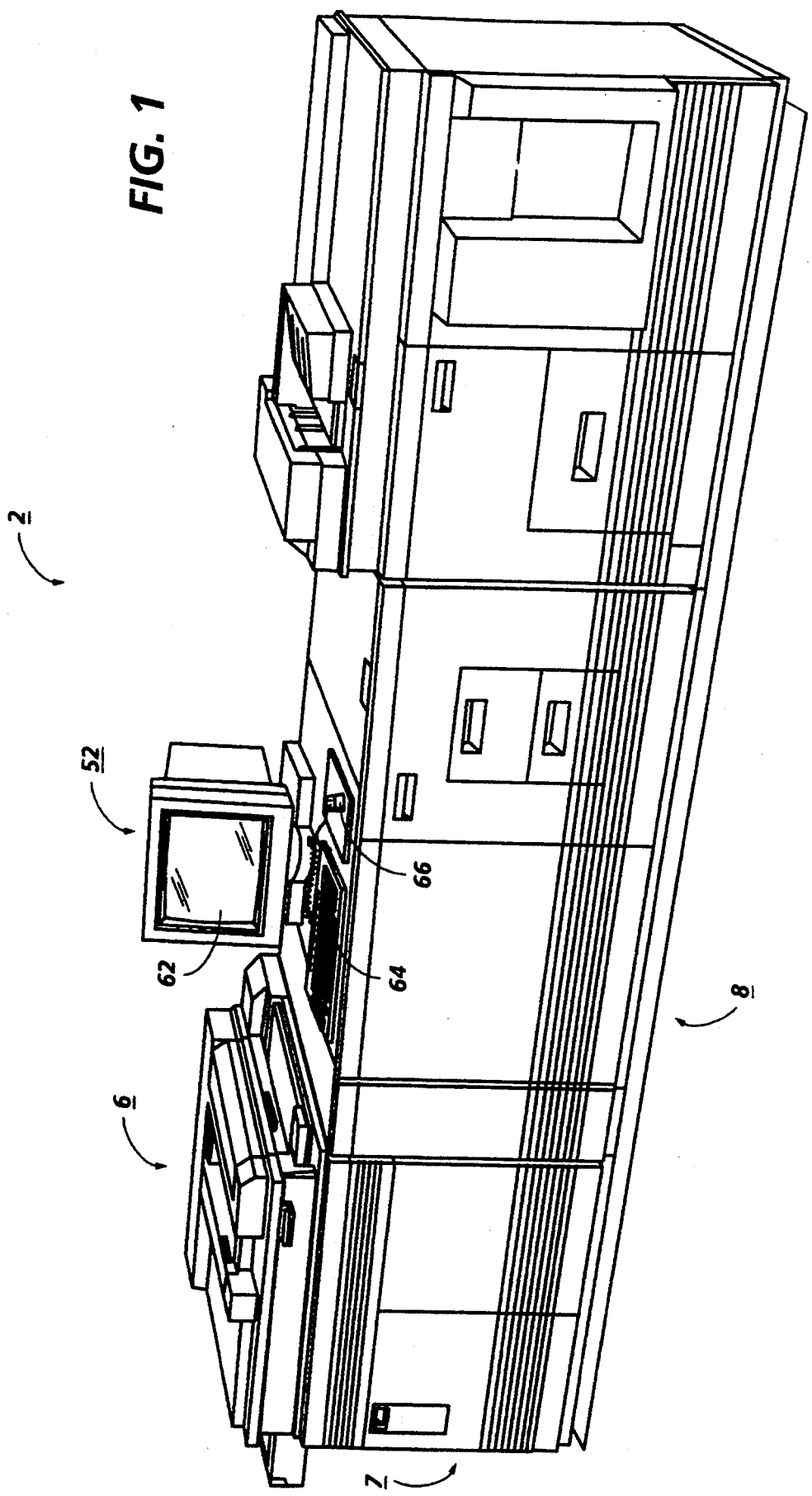
FIG. 1 is a perspective view an electronic printing system incorporating the printing materials cost estimating approach of the present invention.
Figure 2:
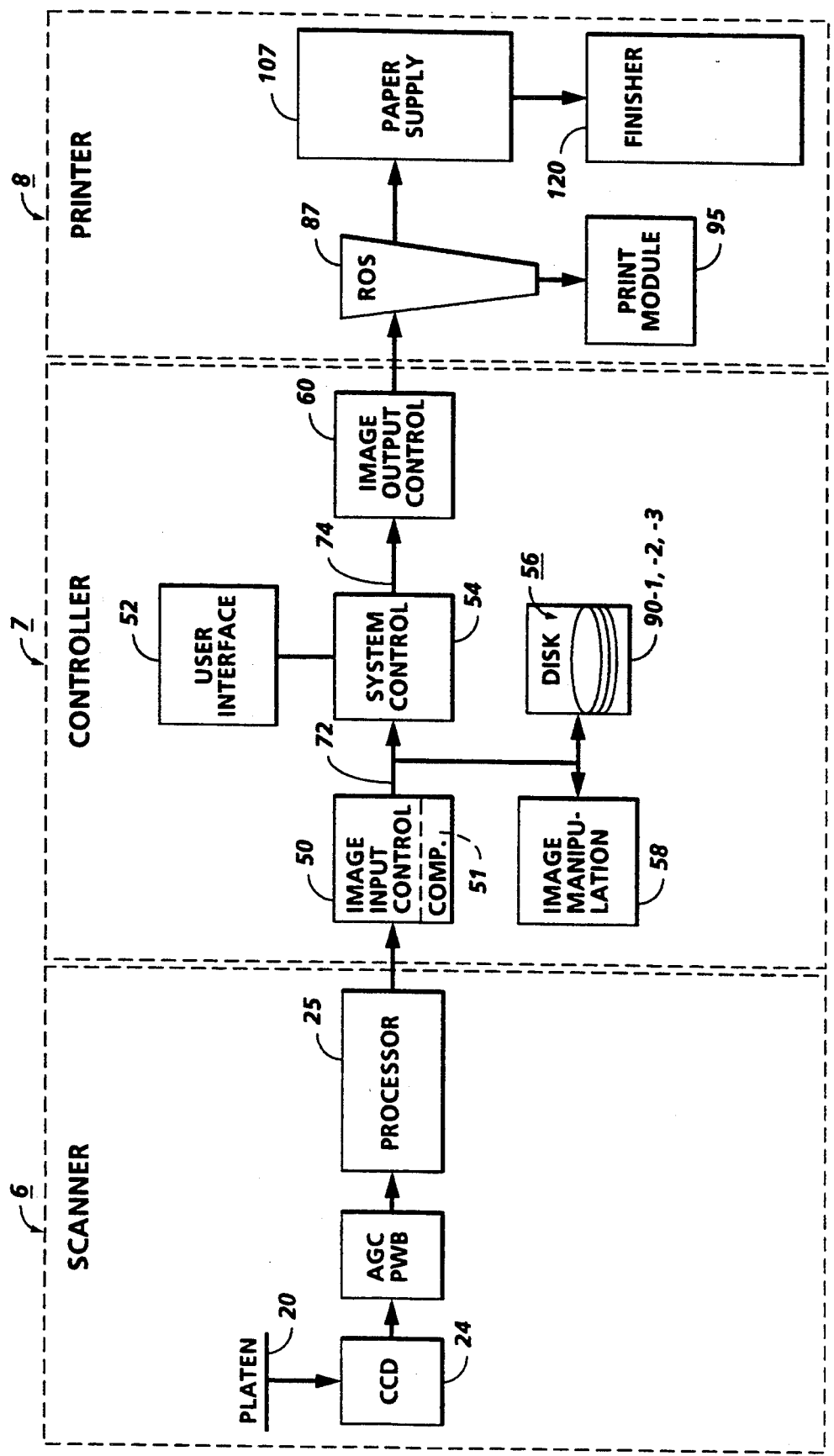
FIG. 2 is a block diagram depicting the major elements of the printing system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
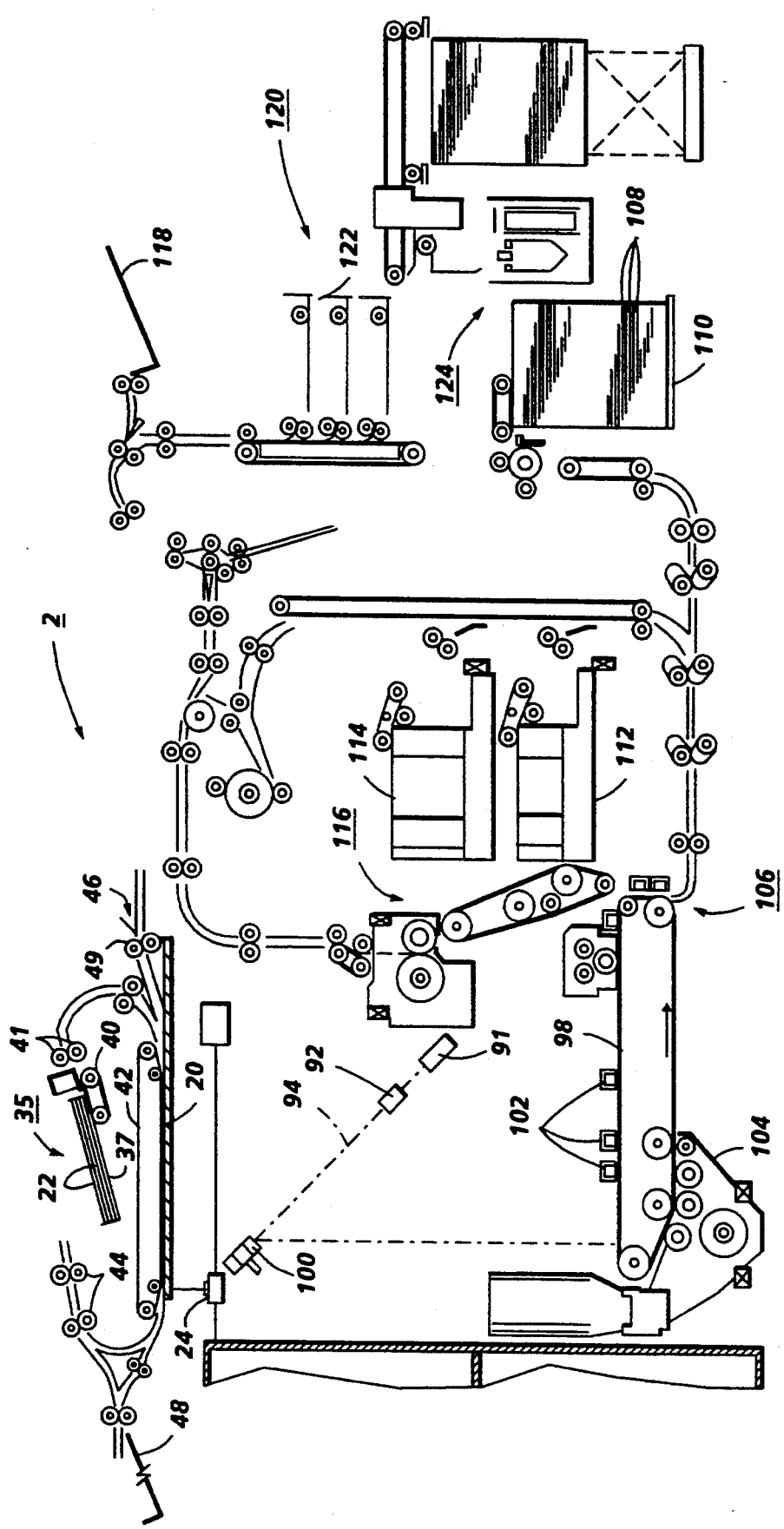
FIG. 3 is an elevational view illustrating the principal mechanical components of the printing system shown in FIG. 1.
Figure 4:
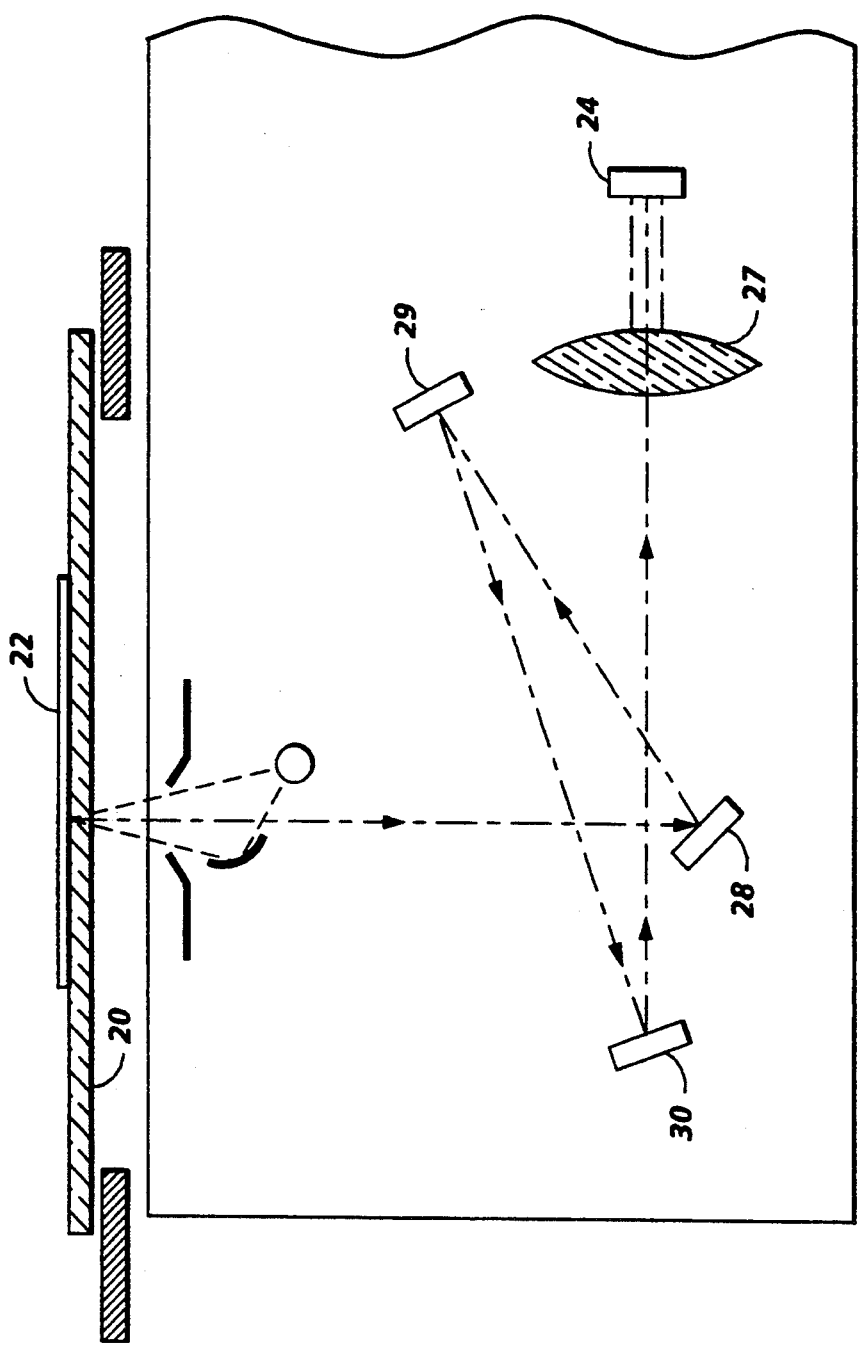
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movements below platen 20. Lens 27 and mirrors 28, 29, 30 cooperate to focus array 24 on a line like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 87 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108, as will appear, may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Figure 5:
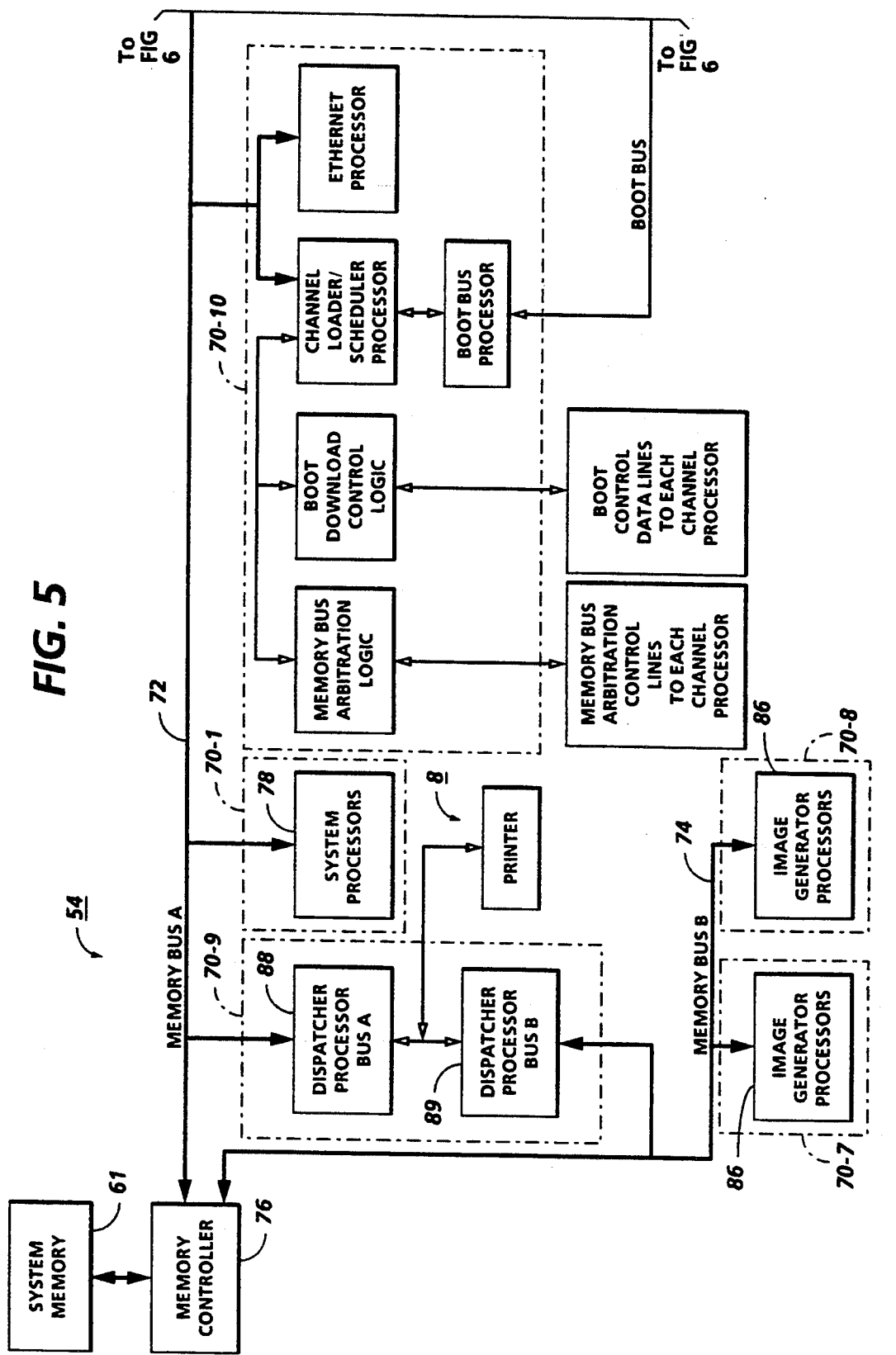
FIGS. 5-7 comprise a schematic block diagram showing the major parts of the control section for the printing system shown in FIG. 1.

Referring to FIGS. 1, 2 and 5, controller section 7 is, for explanation purposes, divided into an image input controller 50, User Interface (UI) 52, system controller 54, main memory 56, image manipulation section 58, and image output controller 60.

Figure 6:
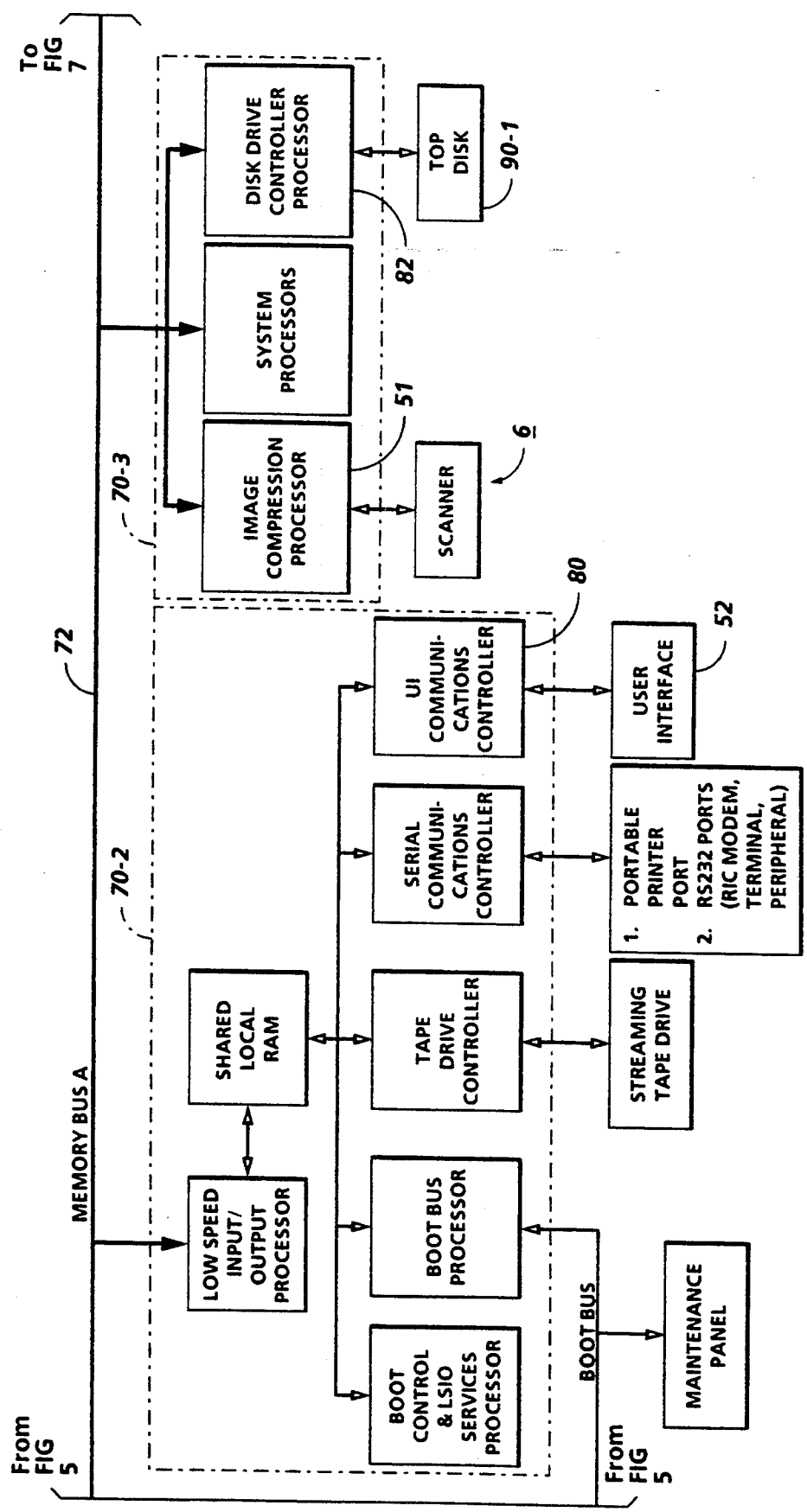
Figure 7:
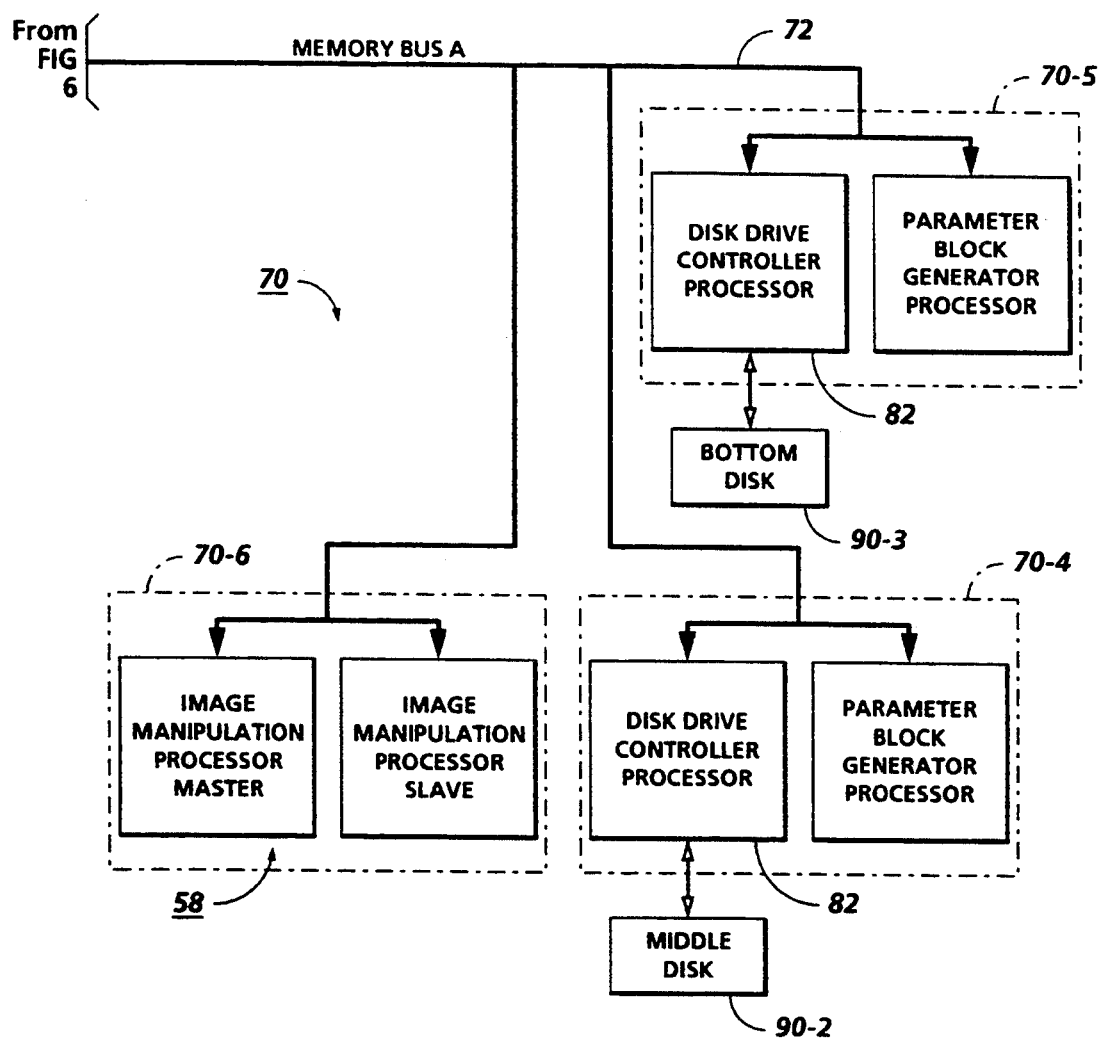

Referring particularly to FIGS. 5-7, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses, 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 (FIG. 9) to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 8:
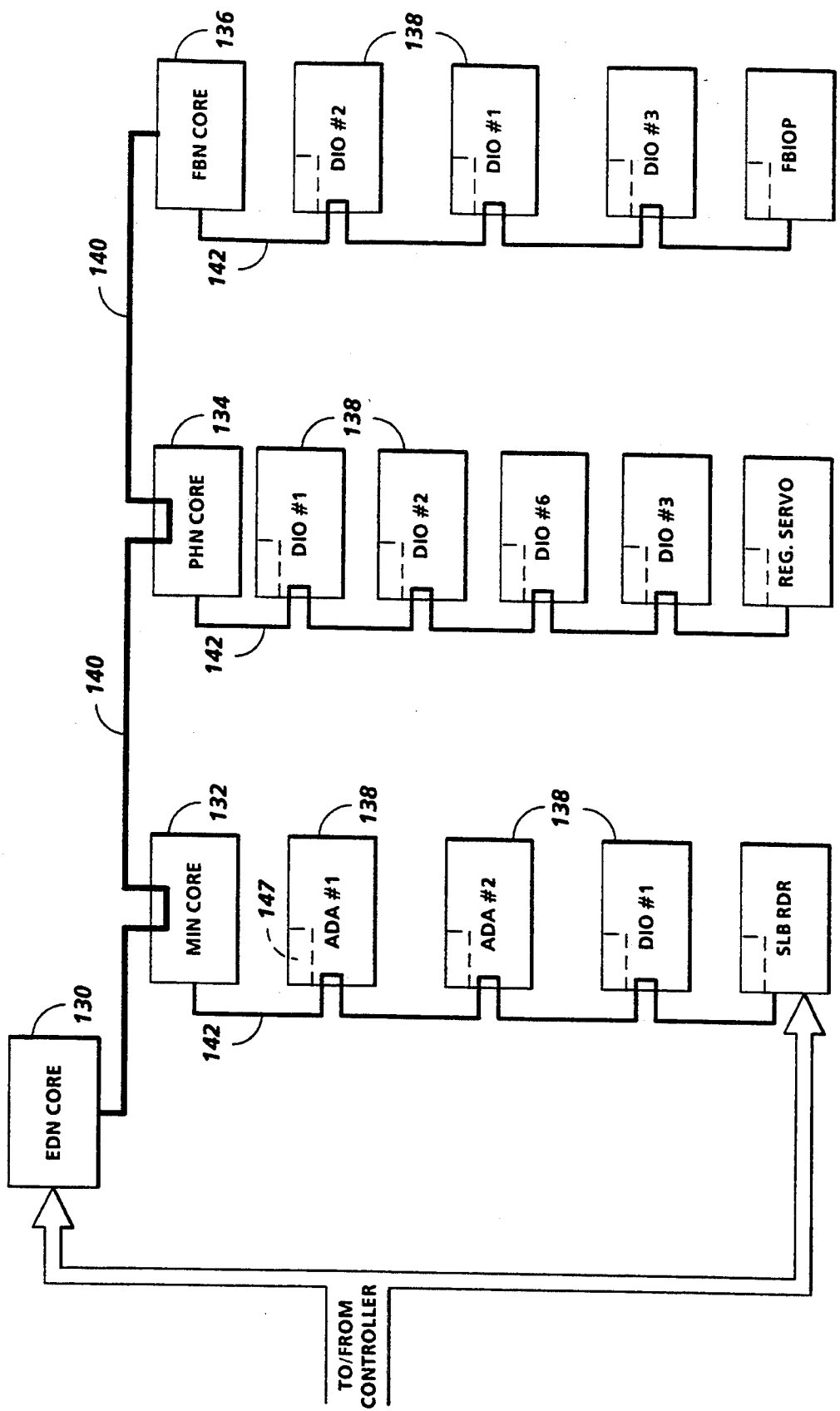
FIG. 8 is a block diagram of the Operating System, together with Printed Wiring Boards and shared line connections for the printing system shown in FIG. 1.

Referring particularly to FIG. 8, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Figure 9:
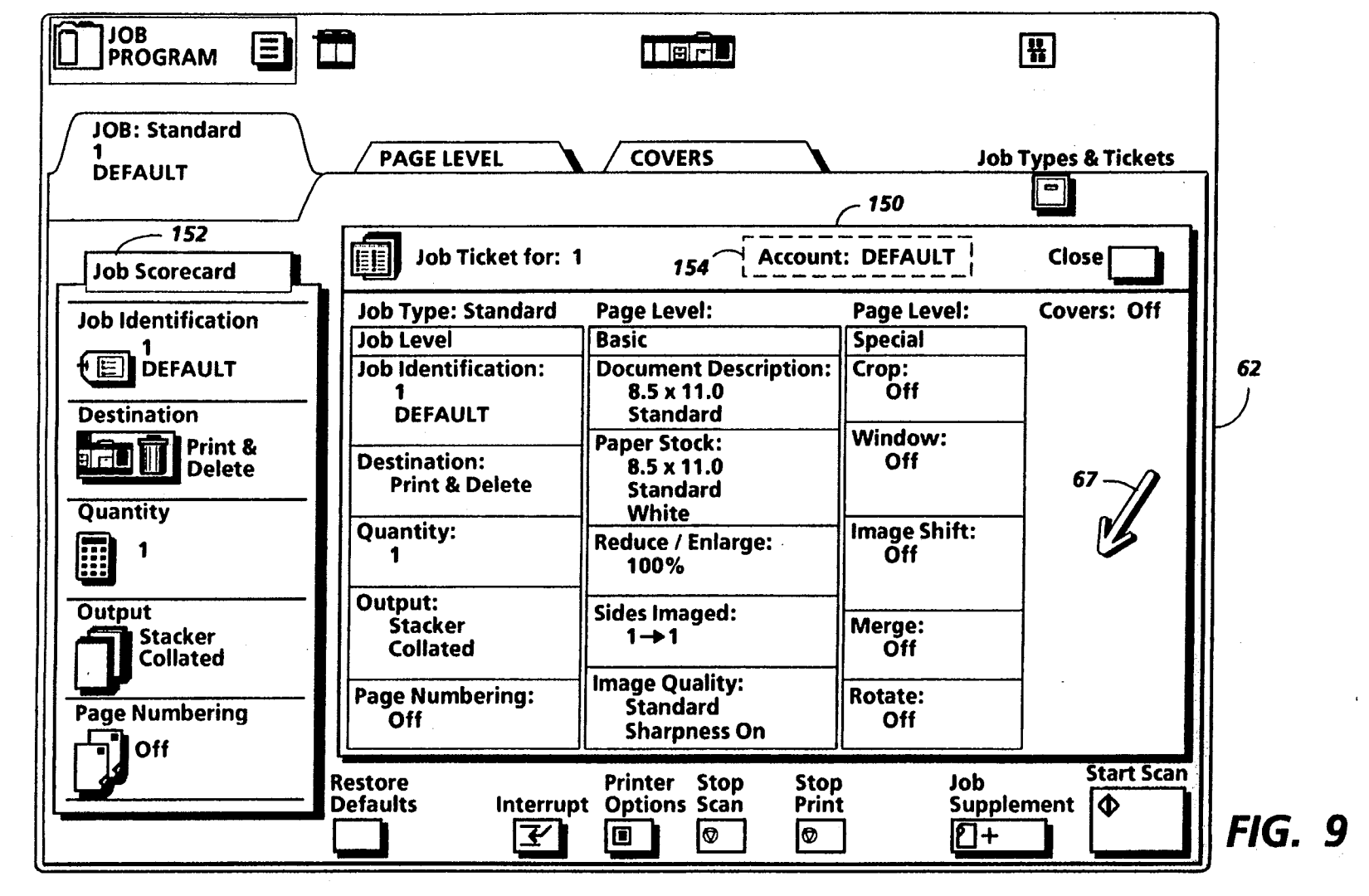

Referring to FIG. 9, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job. The account 154 for the print job is the default account in FIG. 9. Thus, the preprogrammed billing rates for the various functions will be tabulated for the specific print job, unless a particular account with corresponding billing rates is specified by the system operator.

The system described above may include several print jobs in memory since jobs can be scanned at one time and then stored for subsequent printing. Each print job can require a number of different reprographic system functions, such as simplex printing, duplex printing, binding etc. Print jobs can be processed and printed under a specific account number, with system function information for all jobs of the same account being tabulated under the appropriate account number. The system controller 7 can include a mechanism for identifying each account and counting the number of reprographic system functions performed for that specific print job. The system controller 7 can also store the billing rates for the various system functions for each account and calculate the billing cost for that account, as for example, the product of the rate for the printing function and the number of printing functions performed. All information to be inputted into the controller 7 can be accomplished using the UI 52. An approach for calculating the billing cost for a given account is discussed in detail in U.S. Pat. No. 5,146,344 to Bennett et al., the pertinent portions of which are incorporated herein.

Figure 10:
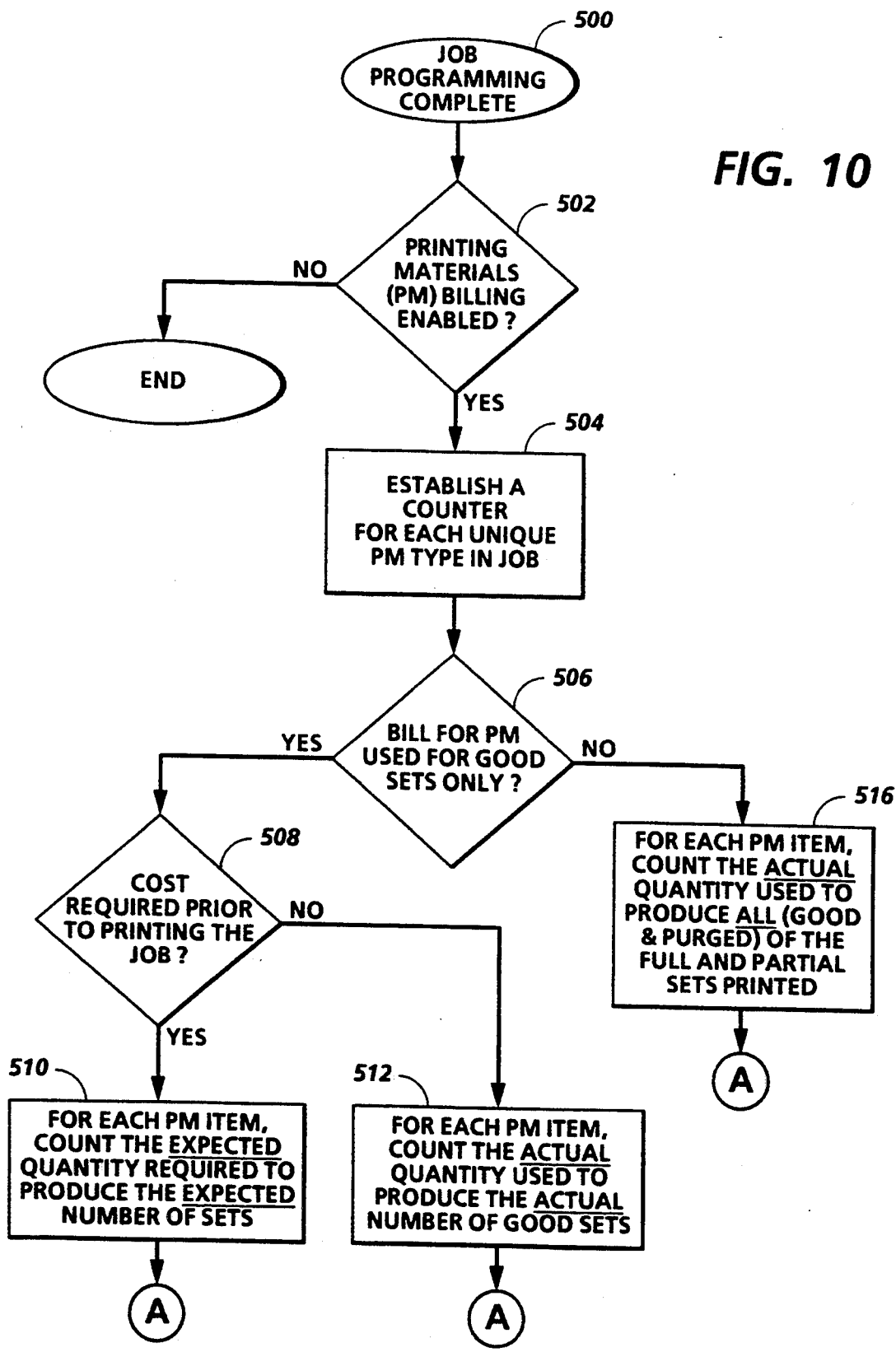
FIGS. 10-11 show the steps involved in estimating a total printing materials cost of the print job.
Figure 11:
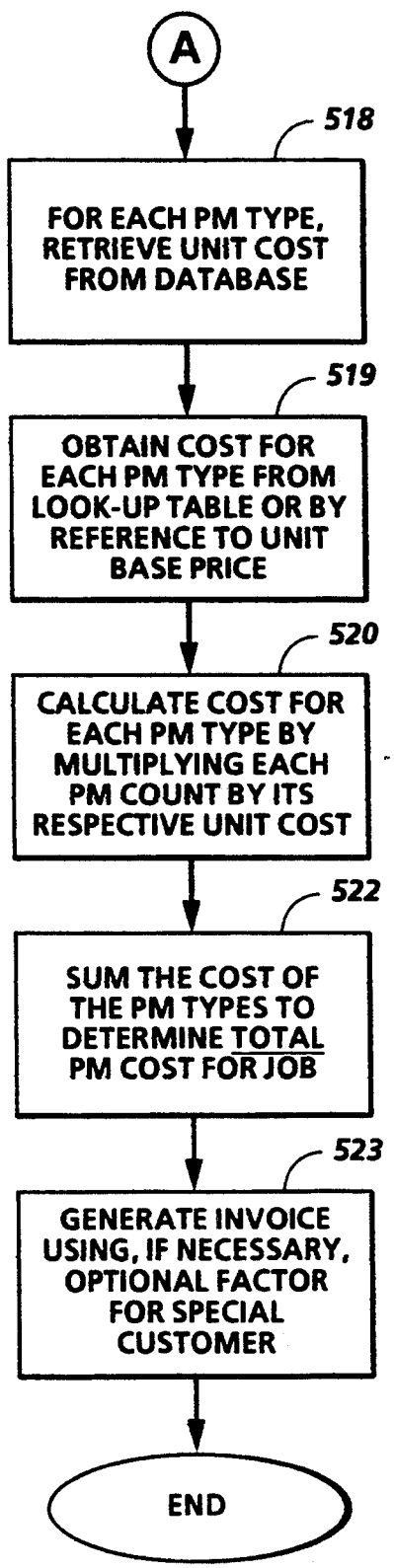

Referring to FIGS. 10 and 11, a method for estimating a printing materials cost of a print job is discussed. As indicated above, the print job is programmed through use of the job ticket. In practice, as elaborated upon in, among others, U.S. Pat. No. 5,095,369 to Ortiz et al., U.S. Pat. No. 5,124,731 to Knodt et al. and U.S. Pat. No. 5,133,048 to Parsons et al., the pertinent portions of which are incorporated herein, the job ticket can be employed to program various options for the job, such as stock type, finishing options, etc. Stock type describes a variety of stock characteristics, including—but not limited to—size, color, substrate material, coatings, surface finish, drilling and punching. Once the various desired options for a given job have been completed (step 500), the estimating process proceeds to step 502 where it is determined whether a printing materials billing or estimating program is enabled. Assuming that the estimating program is enabled, a counter is established for each unique printing materials type to be used in printing the print job (step 504). In one example of operation, the print job will use materials such as stock, toner and finishing materials (e.g. binding tape, staples, stitching material) to complete a print job. It will be appreciated that in some print engines, developer material, other than toner, will be used to produce prints. In other examples, other printing materials may be used to execute the print job. Preferably, one or more of the processors of the controller 7, along with the main memory 56 or system memory 61 (FIGS. 2 and 5) can be used to provide the counters of step 504. Alternatively, the counters could comprise known logical circuitry along with memory.

Once the appropriate counters have been established, it is determined, at step 506, whether billing or estimating is to be for good materials only. Good materials are the materials which are used in the production of output usable to the customer. If billing is to be for good materials only, then, via step 508, it is decided whether printing materials cost is to be determined before printing (step 510) or after printing (step 512). More particularly, at step 510, it is assumed that the expected number of sets will be produced and an estimate is produced via steps 518, 520 and 522 without actually printing the print job. On the other hand, at step 512, it is assumed that printing is required and the actual amount of printing materials used to produce good sets is counted. With this count, printing materials cost is then determined with steps 518, 520 and 522. When the process proceeds through step 512, the customer can avoid costs due to bad prints as well as costs of any materials provided to the machine administrator by the customer. For example, the customer may wish to provide the machine administrator with a preferred stock for use in developing a print job. It stands to reason that the customer should not be charged twice for such provided stock.

If the question of step 506 is answered in the negative, then the process proceeds to step 516. At step 516 a count of each printing materials type used to develop the print job is obtained.

In practice, the unit cost of each printing material type to be used in printing a print job will be stored in a database. Indeed, each printing material type is preferably mapped against a unit cost in a look-up table. In one example, a look-up table is developed in which a plurality of printing materials types is entered and a unit cost is provided for each printing material type. In another example, each unit cost can be expressed as a multiple of a reference value. In this manner, costs for a wide variety of printing material types can be changed "across-the-board" by simply changing the amount of the reference value. This approach is particularly desirable when absolute printing materials costs are difficult to determine or unstable, but relative costs among different printing materials is stable.

In step 518, a unit cost for each printing materials type of the print job is obtained from the database. As described above, the unit costs can be obtained from a look-up table (step 519) or as a multiple of a reference value. In step 520, a cost is determined for each printing material type by multiplying each printing material count obtained in either step 512, 514 or 516 with its respective unit cost. Under certain circumstances, a count is obtained directly from a programmed value. For example, with stock, a count can be determined directly from the programmed job ticket. Under other circumstances, obtaining a count for certain printing materials types may require some inference. In one example, the document being used to develop the print job is scanned with the scanner 6 to estimate image density for the document. Multiplying this image density by a given factor allows for the determination of toner consumption. In turn, such toner consumption can be translated into an appropriate count. Further details regarding pixel counting for purposes of determining toner consumption can be found in U.S. Pat. No. 5,204,699 to Birnbaum et al. the pertinent portions of which are incorporated herein. In another example, the amount of binding tape, stitching material or staples required to execute the print job are estimated by a processor of the controller 7 in view of the dimensions of the document to be used in developing the print job. More particularly, the dimensions of the print job may be determined by reference to the stock-related information of the programmed job ticket.

In step 522, the cost of each printing material type is summed to determine total printing materials cost for the print job. Referring to FIGS. 11 (step 523) and 12, an invoice showing the various printing materials costs of an exemplary print job may be generated. In the illustrated invoice, the costs of such materials as stock (including special stock), toner and finishing materials, are shown. The invoice can be outputted by a variety of means. For example, the invoice may be displayed on the user interface display 62 or printed with the print module 95. It will further be appreciated that the invoice can be adjusted in accordance with various customer types. For example, with certain customers, an optional factor may be employed to generate a special customer invoice.

Numerous features of the disclosed embodiment will be appreciated by those skilled in the art: First, a user is provided with an estimate of printing materials cost for a print job. Obtaining such estimate is particularly useful when the user has limited resources and the materials required to print the print job are relatively great. Second, the estimate can be adjusted readily, by use of a discount or mark-up factor, to accommodate for various customer types. For example, it may be desirable to provide a preferred customer with a discount for selected printing materials. Third, costs between a machine operator and a customer can be allocated fairly in that the presently described technique can be used to exclude costs that should not be paid by the customer. For example, the cost of bad prints or materials provided by the customer can be subtracted from the total printing materials cost. Finally, stock costs can be assessed accurately with the disclosed technique. That is, customers are billed in accordance with both ordinary and special stock used to print the print job.

What is claimed is:

1. A method of estimating cost of printing materials used to print a job on a printing apparatus associated with at least one user interface, comprising the steps of:
   storing billing rates reflecting the cost of printing materials to be used in printing the job;
   programming a job ticket, with the user interface, for selecting a quantity of at least one printing material to be used in printing the job;
   prior to printing the job, generating a value based on the quantity of each printing material selected when programming the ticket; and
   prior to printing the job, calculating, with each value and its associated billing rate, a total printing material cost of the job wherein an estimated printing material cost is communicated to the user.

2. The method of claim 1, wherein communicating the estimated printing material cost to the user includes displaying the estimated printing material cost.

3. The method of claim 1, further comprising the step of basing each of the billing rates on a multiple of a base unit price.

4. The method of claim 1, in which the selected quantity of at least one printing material comprises developer material, the job is generated from an electronic document indicating a number of pixels to be developed with the developer material and one of the stored billing rates comprises a ratio between a developer material cost and a unit amount of developer material, further comprising the step of generating at least one value by reference to the pixel number.

5. The method of claim 1, in which the selected quantity of at least one printing material comprises binding material, the job is generated from a document with dimensions and one of the stored billing rates comprises a ratio between a binding material cost and a unit amount of binding material, further comprising the step of generating at least one value by reference to the dimensions.

6. The method of claim 1, wherein:
   said storing step includes storing a billing rate reflecting a binding material cost factor.

7. The method of claim 1, further comprising the step of storing an optional mark-up factor for generating a customer invoice.

8. The method of claim 1, wherein:
   said step of programming the job ticket for selecting the quantity of at least one printing material comprises specifying that the selected quantity of at least one printing material includes a first print media sheet type and a second print media sheet type.

9. The method of claim 8, in which the job is printed to produce a plurality of prints including a first selected number of print media sheets and a second selected number of print media sheets, further comprising the steps of:
   determining which ones of the plurality of prints should not be considered as part of the total printing material cost for the job; and
   changing the total printing material cost for the job, as a function of said determining step, to a revised total printing material cost.

10. A printing apparatus with the capacity to estimate the cost of printing materials used to print a job, comprising:
   a memory section for storing billing rates reflecting the cost of printing materials to be used in printing the job;
   a user interface for programming a job ticket to select a quantity of at least one printing material to be used in printing the job;
   a processor for generating a value based on the quantity of each printing material selected when programming said user interface, each value being programmed prior to the printing of the job; and
   prior to printing the job, said processor calculating, with each value and its associated billing rate, a total printing material cost for the job, wherein an estimated printing material cost is communicated to the user.

11. The printing apparatus of claim 10, in which the selected quantity of at least one printing material comprises developer material, the job is generated from an electronic document indicating a number of pixels to be developed with the developer material and one of the stored billing rates comprises a ratio between a developer material cost and a unit amount of developer material, wherein at least one of the values is generated by reference to the pixel number.

12. The printing apparatus of claim 10, in which the selected quantity of at least one printing material comprises binding material, the job is generated from a document with dimensions and one of the billing rates comprises a ratio between a binding material cost and a unit amount of binding material, wherein at least one of the values is generated by reference to the dimensions.

13. A method of estimating cost of printing materials used to print a job on a printing apparatus associated with at least one user interface, comprising the steps of:

storing billing rates reflecting the cost of printing materials to be used in printing the job;

programming a job ticket, with the user interface, for selecting a quantity of printing materials to be used in printing the job;

prior to printing the job, generating values based respectively on quantities of printing materials selected when programming the job ticket; and prior to printing the job, calculating, with the values and their associated billing rates, a total printing material cost of the job wherein an estimated printing material cost is communicated to the user.

* * * * *